United States Patent
Raue

[15] 3,706,375
[45] Dec. 19, 1972

[54] PRECISION AUTOMATIC WEIGHING SYSTEM

[72] Inventor: Emil J. Raue, Whippany, N.J.

[73] Assignee: The United States of America as represented by the Secretary of the Army

[22] Filed: Feb. 16, 1971

[21] Appl. No.: 115,268

[52] U.S. Cl. .................... 209/121, 177/50, 177/123, 221/79
[51] Int. Cl. ........................................... B07b 13/08
[58] Field of Search ........... 222/55, 56, 57, 38.6, 368; 177/50, 122, 123; 209/121, 94; 221/79, 233, 266, 277, 13, 112

[56] References Cited

UNITED STATES PATENTS

| | | | |
|---|---|---|---|
| 3,209,844 | 10/1965 | Stambera et al. | 177/123 X |
| 2,479,878 | 8/1949 | Strelzoff | 221/266 X |
| 2,980,251 | 4/1961 | Howard | 209/121 |

Primary Examiner—Robert B. Reeves
Assistant Examiner—Francis J. Bartuska
Attorney—Harry M. Saragovitz, Edward J. Kelly, Herbert Berl and Ernest F. Weinberger

[57] ABSTRACT

Two complimentary feeds are provided, the first from an alternate shuttle hopper feed employing a pair of volumetric metering cups provides a weight slightly less than the desired metered weight. The difference between the required metered weight and the short weight is scaled, determined and converted into an electrical analog signal. The second feed consists essentially of a hollow cylinder provided with a plurality of outwardly directed apertures asymmetrically arranged in longitudinal rows. Within the cylinder there is disposed a closed elastomeric tube, which when filled with air at low pressure will bear against the inner surface of the cylinder for ejection of material in said apertures. The feed cylinder is supported for rotation and coupled to an electrically controlled drive for selectable angular displacement thereof. Also included in a sensor for indicating electrically the angular position of the cylinder and whose output, with the analog short weight signal, are applied to an electronic control device which thereupon provides an output signal to said controlled drive to displace the cylinder a sufficient amount to dispense material, previously deposited in said recesses, to accurately compensate for the short weight. A vibratory feed supply is associated with the cylinder so as to provide a pellet for each aperture as it passes the feed point and a receptacle for receiving the pellets as they are gravity ejected.

6 Claims, 8 Drawing Figures

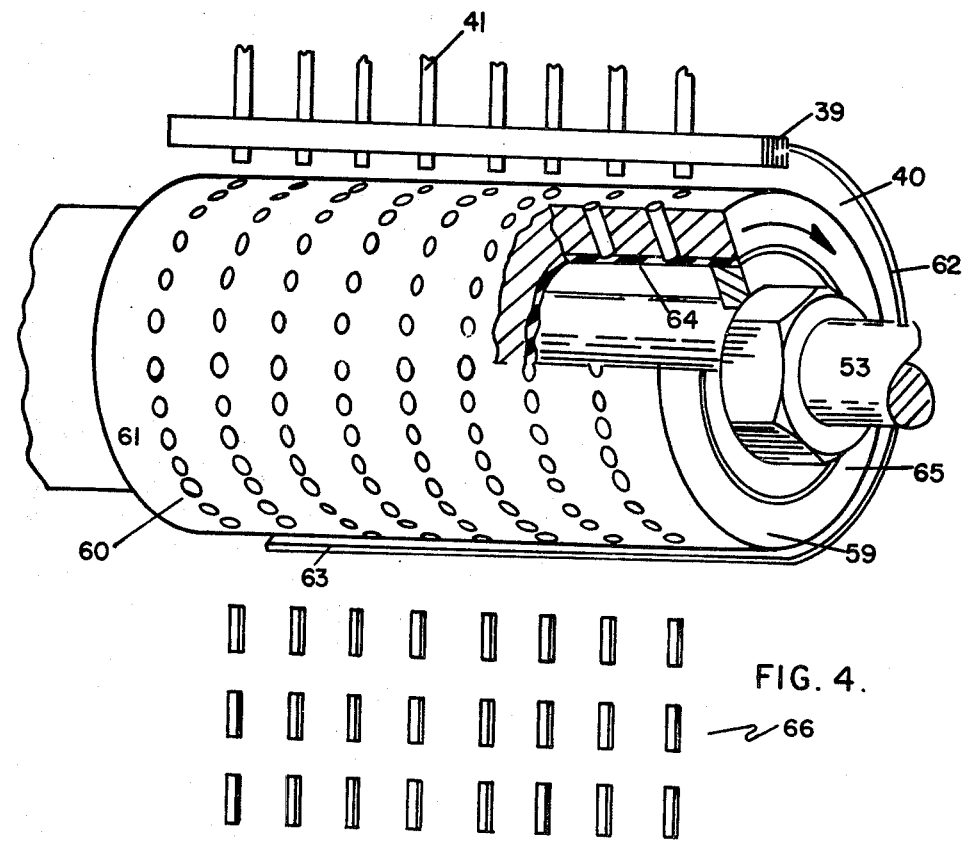
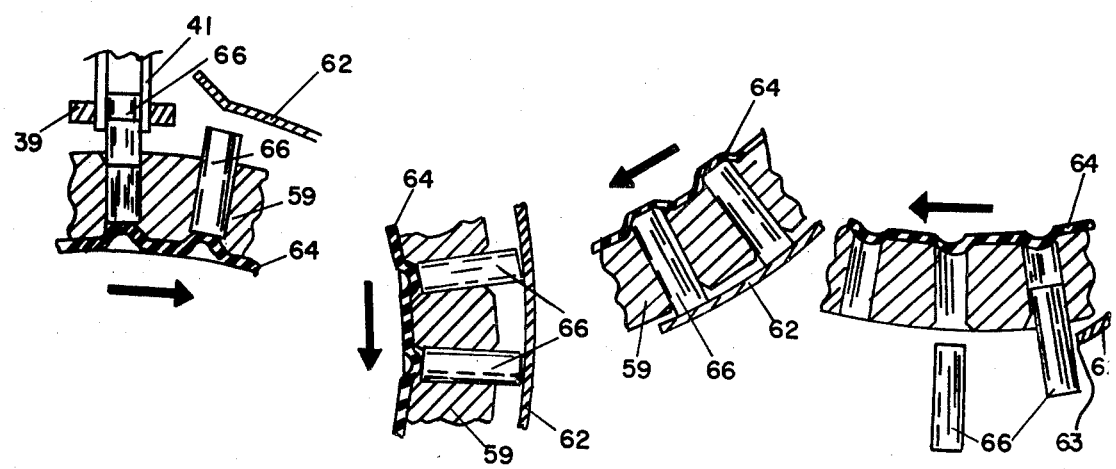
FIG. 4.
FIG. 5.    FIG. 6.    FIG. 7.    FIG. 8.
INVENTOR,
EMIL J. RAUE

PRECISION AUTOMATIC WEIGHING SYSTEM

The invention described herein may be manufactured, used and licensed by or for the Government for governmental purposes without the payment to me of any royalty thereon.

BACKGROUND OF THE INVENTION

The present invention relates to metered weighing systems and more particularly pertains to an automatic weighing device which employs practice increment addition to a short weigh delivery.

In the field of production weighing delivery systems it has been the general practice to design equipment wherein it is necessary to trade-off weight accuracy, production rate and manual labor. Increased accuracy is attained generally at the expense of lowered production rates or the use of added labor costs. Contra, high production rates are attainable with a relaxation of weight accuracy. Current systems even with their refinements and improvements have not provided an overall satisfactory solution to the paired problem of production rate and accuracy.

SUMMARY OF THE INVENTION

The general purpose of the present invention is to provide a highly accurate weighing/delivery system that has all the advantages of similarly employed prior art devices and has none of the above described disadvantages. To attain this, the present invention provides a unique precision delivery unit which comprises a hollow cylinder having a plurality of axially asymmetrical rows of apertures into which are fed pellets of the material to be weighed. The inner portion of the cylinder carries an inflatable tube for positive ejection of the pellets. Coupled to the rotational drive system for the cylinder is an electrically controlled motor and an encoder which are connected to an electronic control circuit which also receives the short weight indication of a previously bulk metered and scaled supply of material. The control circuit directs the cylinder for sufficient angular displacement to dispense an amount of pellets which when added to the short weight will equal the metered weight.

An object of this invention is to provide a high speed automatic weighing and delivery system for material in the form of pellets that is simple, reliable, relatively inexpensive, and extremely accurate.

Another object is the provision of an automatic weighing/delivery system which employs feed back and is self correcting with the capability of singular delivery.

Still another object is to provide a weighing/delivery system incorporating a high degree of personnel safety, namely, a minimum of manual operation as well as low unit production cost.

Other objects and many of the attendant advantages of this invention will be readily appreciated as the same becomes better understood by reference to the following detailed description when considered in connection with the accompanying drawings.

BRIEF DESCRIPTION OF THE DRAWINGS

FIG. 4 is a perspective view, with a portion removed of the unit metering drum or cylinder; and, FIGS. 5–8 are cross-sectional views of a portion of the drum at various rotational positions.

BRIEF DESCRIPTION OF A PREFERRED EMBODIMENT

Figure 1:
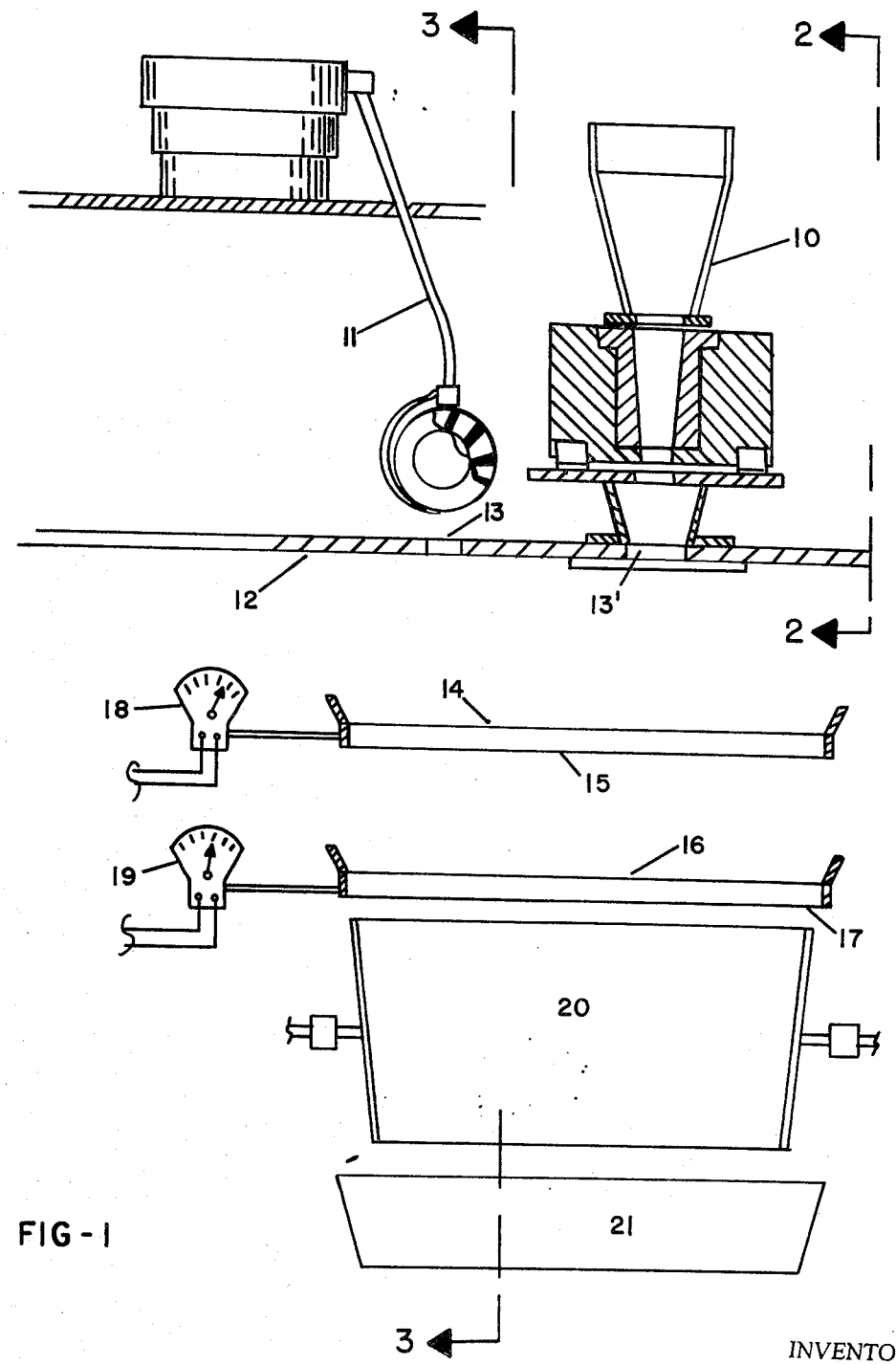
FIG. 1 is a sectional view of an embodiment made in accordance with the principle of this invention.

In the illustrated embodiment of FIG. 1 a pair of feed systems namely a bulk feeder 10 and a unit feed 11 which are both supported (not shown) on and above a bed plate 12 that is provided with a pair of openings 13 and 13' directly under each feed system. Disposed directly beneath the openings is a short weight weighing pan 14 whose lower wall or base 15 is of a shuttered construction so as to selectively permit any material therein to be dropped through to a check weight pan 16 which is likewise provided with a shuttered base 17. Each pan is affixed to a balance scale (18, 19) and provides an electrical output that is proportional to the weight of the pan contents. One such suitable scale, employing a capacitive type transducer, is the Digimetric Scale manufactured by the William Ainsworth Co., Denver, Colo. Disposed below the pan 16 is an accept-reject deflector or guide 20 which diverts the dispensed material into one of two trays 21 and 22 (shown in FIG. 2).

Figure 2:
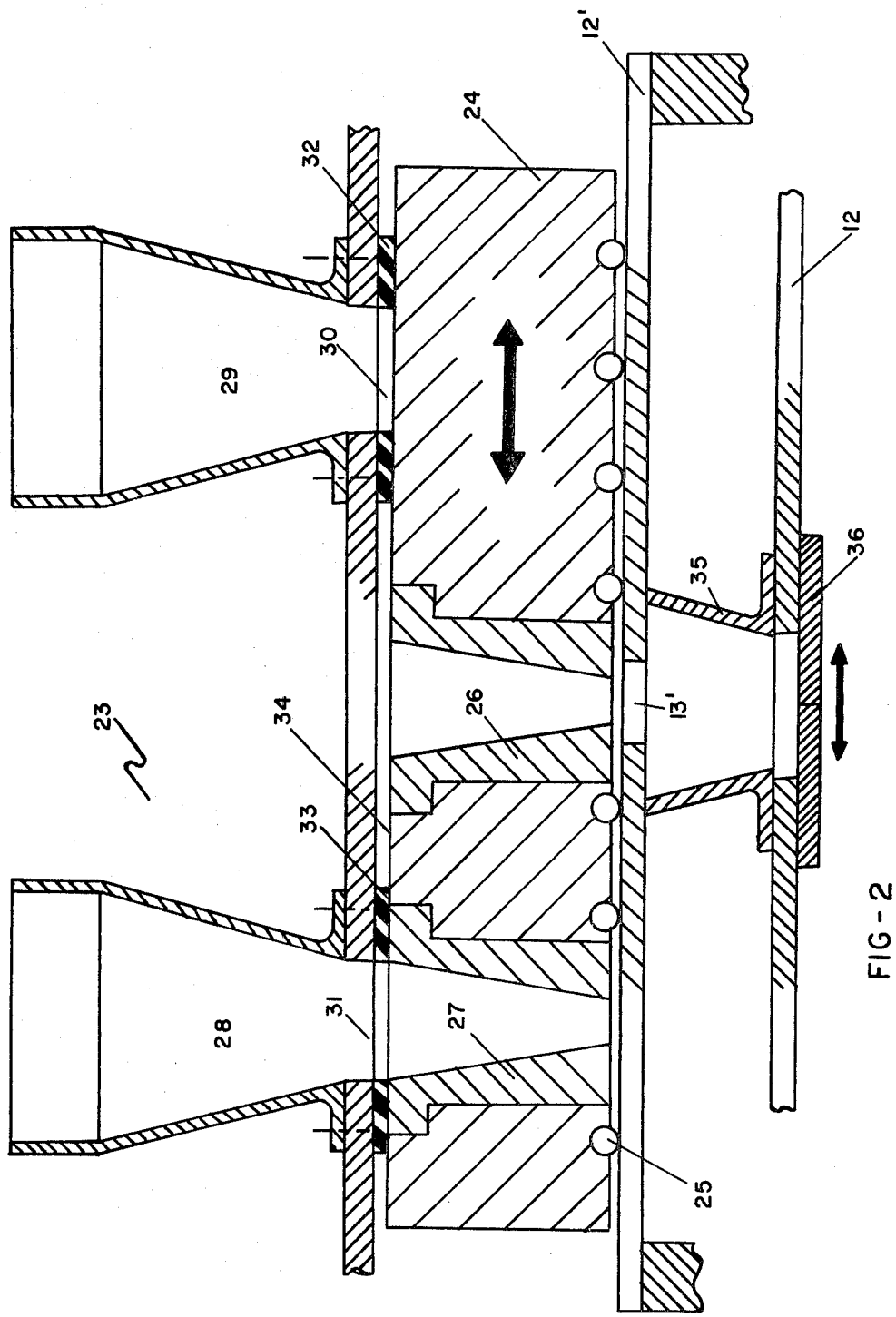
FIG. 2 is a cross-sectional view of the shuttle bulk feeder taken approximately along 2—2 of FIG. 1.

FIG. 2 shows in detail the structural relationship of the components of the bulk feed system which includes an upper shuttle structure 23 comprising a slide base support member 24 that carries a plurality of rollers 25 for permitting reciprocation thereof on the slide bed 12'. The slide base 24 is formed with a pair of metering cavities or openings therethrough in which are disposed a pair of identical volumetric metering cups 26, 27. The volume of the cups is selected, dependent on the final weight required and the cavities are formed to accommodate various volume cups. Separately and fixedly supported above the slide base 24 are a pair of bulk feed hoppers 28, 29 open at the lower end 30, 31 and provided thereat with doctoring rings 32, 33 which may be of any soft elastomer such as sponge, and are fitted to rub or abut the upper face 34 of the slide bed and provide a wiping action. Rigidly affixed to the bed plate 12 directly below the opening 13' is a bulk feed funnel 35 whose lower discharge portion carries a shutter arrangement 36 for closing across the funnel opening. Neither the reciprocating slide drive nor the motive force for the shutter is shown although such mechanisms are well known in the art as well as their overall synchronization. The bulk feed system is illustrated with the slide at one end of its travel such that hopper 28 is aligned over metering cup 27 so as to fill the same. In this position metering cup 26 is located above opening 14 and funnel 35 so as to permit disposition of its contents therein. When the slide bed 24 reciprocates (to the right) metering cup 27 will terminate its travel above the bed plate opening and cup 26 will be under hopper 29 so that cup 26 will empty and cup 27 will be filled. Thus it is clear that while reciprocating, one cup fills while the other dispenses and the doctoring rings 32, 33 wipe off any excess and maintain a sidewise closed surface about the hopper bases.

Figure 3:
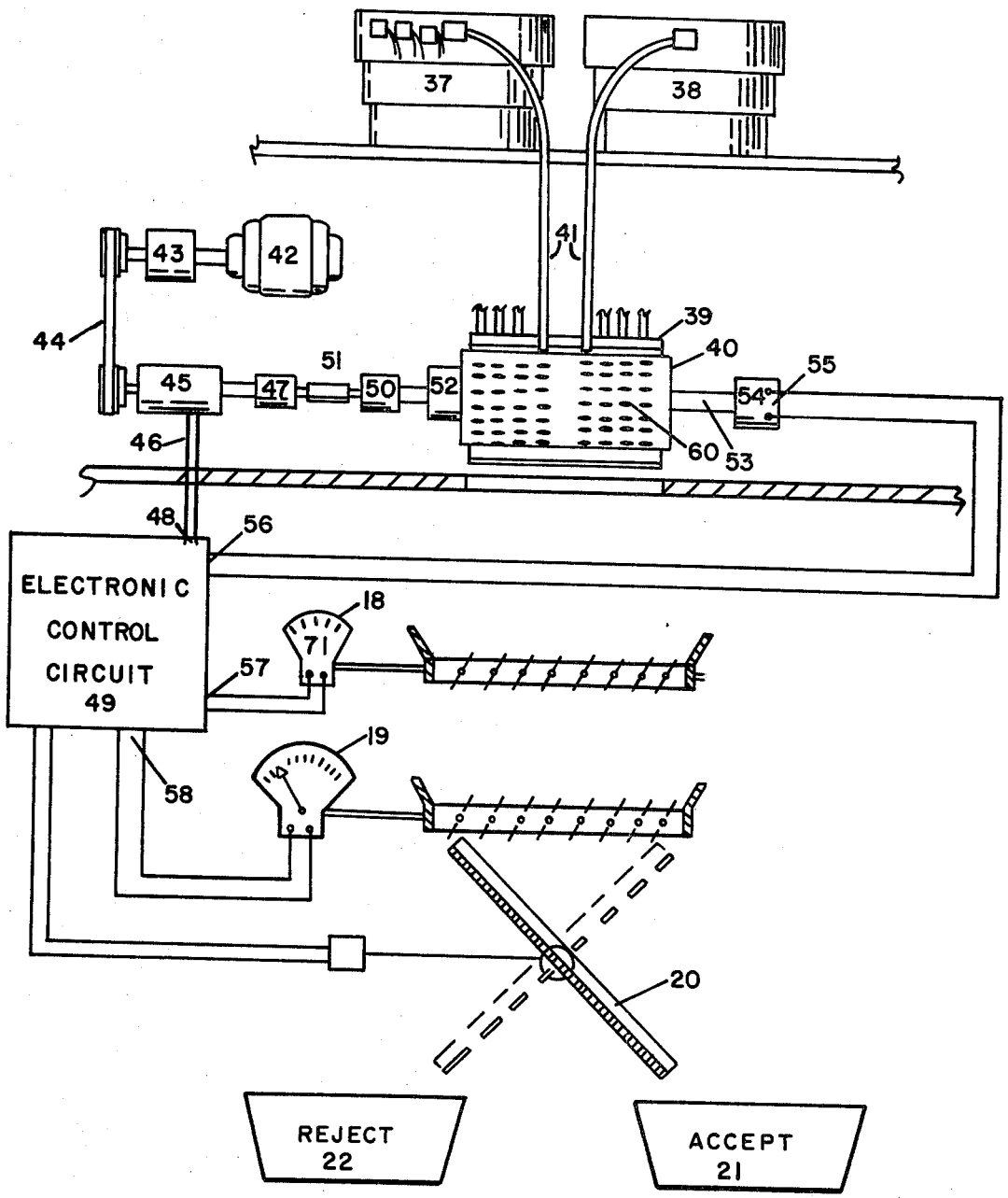
FIG. 3 is a cross-section taken approximately along 3—3 of FIG. 1.

For the purposes of this disclosure the material to be weighed is in the form of solid cylindrical pellets of individual minute weight so that the metering cups can be filled to an approximate weight slightly less than the final necessary exact metered weight. Referring now to FIG. 3 wherein the basic components of the unit feed system are clearly shown, a pair of rotary feeders 37, 38 are connected to the feed support 39 positioned vertically above the hollow cylindrical drum 40 via unit feed tubes 41 which terminate in the appropriate apertures of the support 39. The drum 40 is provided with a circularly encompassing series of longitudinal rows of apertures 60 which are slightly asymmetrical with respect to the drum axis. The separation between the support 39 and the upper peripheral edge of the drum is somewhat less than the length of the smallest pellet and is aligned with the drum axis so that the apertures are filled individually with a single pellet at a time. The pellets enter the drum apertures under gravitational force as the drum rotates. A variable speed motor 42 provides the motive power through slip clutch 43 and pulley arrangement 44 which in turn drives a magnetic clutch 45. The magnetic clutch is equipped with a pair of control leads 46 for controlling its transmission of drive to speed reducer 47. These leads are connected to one set of output terminals 48 of the electronics control circuit 49. Another slip clutch 50 and coupler 51 are intermediate the speed reducer and the drum drive input 52. The drum shaft 53 extends outwardly on the opposite side and carries encoder 54 which provides an electrical output at terminals 55 which is an analog of the angular drum displacement from some reference. This output is connected to input terminals 56 of the electronics control circuit 49. Thus, the control circuit receives the angular position of the drum and provides an output to control the drum displacement. Additionally, the control circuit receives a signal from weighing scale 18 at terminals 57, and a signal from check weigh scale 19 at terminals 58 so that it can determine the short weight and provide a control at the clutch 45 to displace the drum a sufficient amount so that it will deliver the necessary pellets to make-up the short weight and, if correct will control the position of the guide 20 to divert the load from pan 16 to the accept holder 21. Otherwise, the load is guided into reject tray 22 and thereafter returned to a feed hopper. The control signals are proportioned to reflect the average weight of a single pellet and convert it into the number of pellets to make the necessary weight compensation.

In the illustrated embodiment of the drum structure disclosed in FIG. 4, the main assembly includes a hollow cylindrical member 59 which is provided with a plurality of radical apertures 60 arranged in axially asymmetrical rows 61 (approximately 1 ½° off axis) and extending from face to face therethrough. The support 39 is aligned with the drum axis and therefore only one aperture is aligned with one of the feed tubes 41 at any one instant. The support 39 also carries a retainer shield 62 which is in the general form of an axially divided semi-cylinder being spaced a greater distance from the drum surface proximate the support 39 and progressively approaching the surface and terminating diammetrically opposite the support in a straight axial edge 63. Disposed within the cylinder is a closed elastomeric inner tube or hose 64 whose outer surface resiliently abuts the inner cylinder surface when the tube is inflated to a low pressure. This provides an outwardly directed biasing force at the base of the aperture as well as closing that end of the aperture. In order to structurally accommodate this tube the ends of the cylinder may be closed by a circular plate 65 which is affixed thereto and carries a centrally coaxial outwardly extending shaft 53. The cylinder rotates in the direction indicated with a clear showing of the disposition of the pellets 66 in various stages of travel illustrated in FIGS. 5 through 8.

FIG. 5 shows the apertures when they are positioned at their uppermost point under the feed support 39 and one is receiving a pellet just prior to entering under and within the retainer 62. As the apertures with the inserted pellets progress clockwise, the outer upper edges of the pellets abut the inwardly directed retainer, then they are progressively forced thereby inwardly and compress the portion of tube 64 disposed within the aperture. This is clearly shown in FIG. 6 and FIG. 7 wherein the separation between the retainer and the drum reaches a minimum and fully inserts the pellet. The retainer 62 terminates (see FIG. 8) at edge 63 and as the apertures pass this edge the pellets are forcibly and positively ejected by the restoring biasing action of the low pressure tube 64. It is also clear that since the retainer edge 63 is in axial alignment and the aperture rows are not, only one pellet will be delivered by the drum for each increment of rotation. As for example, with eight apertures per row and each row at approximately a 10° lead angle, a rotation of approximately 1.25° is required for the delivery of each pellet. This degree of control is quite readily attainable with present day equipment and therefore the device is capable of selected delivery to within one pellet, thereby effectively representing control over every grain pellet in a load increment.

Briefly described the system will take pellet grain from suitable hoppers and apportion the grain into two separate and distinct supply systems. The major portion of the grain will move through the bulk feed system where the accuracy requirement is liberal and the system is thus capable of high cylic rates. When this bulk has been weighed the control system will place a demand on the fine or singular feed system to supply individually controlled grain weight from the drum until the make up grains have brought the combined supply from the two systems to the desired increment and weight value.

It should be understood, of course, that the foregoing disclosure relates to only a preferred embodiment of the invention and that numerous modifications or alterations may be made therein without departing from the spirit and the scope of the invention as set forth in the appended claims.

I claim:
1. A system for delivering an accurate, metered weight of grain pellets and such, which comprises:
   means for providing an electrical output indicative of said weight,
   a unit feed means which includes:
      a cylindrical drum supported for axial rotation and having a plurality of longitudinal rows of outwardly open, radially directed apertures receiving individually therein said pellets, said rows being axially asymmetrical, delivery means for inserting said pellets into said apertures at one position station of said drum, means for singularly releasing said pellets at another position station of said drum, displacement indication means for providing an output indicative of the angular position of said drum, electrically controllable drive means for starting and stopping of said drum rotation, electrical control means connected to receive said outputs of said means indicative of said metered eight and displacement indication means and for providing a control output connected to said drive means to start and stop rotation of said drum to deliver a quantity of said pellets of said metered weight, wherein said means indicative of said weight includes a pan for receiving said weight of said pellets, said means for singularly releasing is a semi-cylindrical shield disposed proximate the outer surface of said drum extending from said delivery means to an opposite side of said drum, and wherein said drum is hollow and said apertures extend therethrough and includes biasing means closing across the internal opening and resiliently extending thereinto.

2. The system according to claim 1 wherein said biasing means is an inflatable elastomeric hose disposed within said drum and abutting the inner surface thereof.

3. A system for delivering an accurate, metered weight of grain pellets and such, which comprises:

a bulk feed means for delivering a weight of said pellets short of said metered weight, weighing means for providing an electrical output indicative of said short weight, a unit feed means which includes:

a cylindrical drum supported for axial rotation and having a plurality of longitudinal rows of outwardly open, radially directed apertures receiving individually therein said pellets, said rows being axially asymmetrical, delivery means for inserting said pellets into said aperture at one position station of said drum, means for singularly releasing said pellets at another position station of said drum, displacement indication means for providing an output indicative of the angular position of said drum, electrically controllable drive means for starting and stopping of said drum rotation, electrical control means connected to receive said outputs of said weighing means and displacement indication means and for providing a control output connected to said drive means to start and stop rotation of said drum to deliver a quantity of said pellets sufficient when added to said short weight to attain said metered weight, wherein said weighing means includes a pan for receiving said short weight of said pellets, said means for singularly releasing is a semi-cylindrical shield disposed proximate the outer surface of said drum extending from said delivery means to an opposite side of said drum, and wherein said drum is hollow and said apertures extend therethrough and includes biasing means closing across the internal opening and resiliently extending thereinto.

4. The system according to claim 3 wherein said biasing means is an inflatable elastomeric hose disposed within said drum and abutting the inner surface thereof.

5. The system according to claim 4 further including a final check weighing means including a check pan for receiving both said short weight and said quantity of said pellets and for releasing the same.

6. The system according to claim 5 further including guide means disposed below said check pan, for deflecting the released contents of said pan for rejection and accepting in accordance with the metered weight of said contents.

* * * * *